358-190 SR

XR 3,904,973

United States Patent [19]

Haferl

[11] 3,904,973

[45] Sept. 9, 1975

[54] COMBINED AMPLIFIERS WHICH CONSUME SUBSTANTIALLY CONSTANT CURRENT

[75] Inventor: Peter Eduard Haferl, Adliswill, Switzerland

[73] Assignee: RCA Corporation, New York, N.Y.

[22] Filed: Apr. 22, 1974

[21] Appl. No.: 462,840

[30] Foreign Application Priority Data

Nov. 21, 1973 United Kingdom.............. 53985/73

[52] U.S. Cl........... 330/22; 178/DIG. 11; 330/30 R; 330/127

[51] Int. Cl........................................... H03f 3/68

[58] Field of Search............. 330/22, 30 R, 40, 127, 330/128; 178/DIG. 11

[56] References Cited

UNITED STATES PATENTS 3,753,138 8/1973 Svendsen ......................... 330/40 X

*Primary Examiner*—James B. Mullins
*Attorney, Agent, or Firm*—Eugene M. Whitacre; Paul J. Rasmussen

[57] ABSTRACT

First and second amplifiers which consume varying currents are combined in such a manner as to require a common substantially constant power supply current. An energy storage device coupled to both amplifiers stores energy during periods of low current consumption by the first of the amplifiers. This stored energy is then provided for the second amplifier during periods of high current consumption by the first. A control circuit is provided which allows the first amplifier priority in fulfilling its current requirements.

8 Claims, 1 Drawing Figure

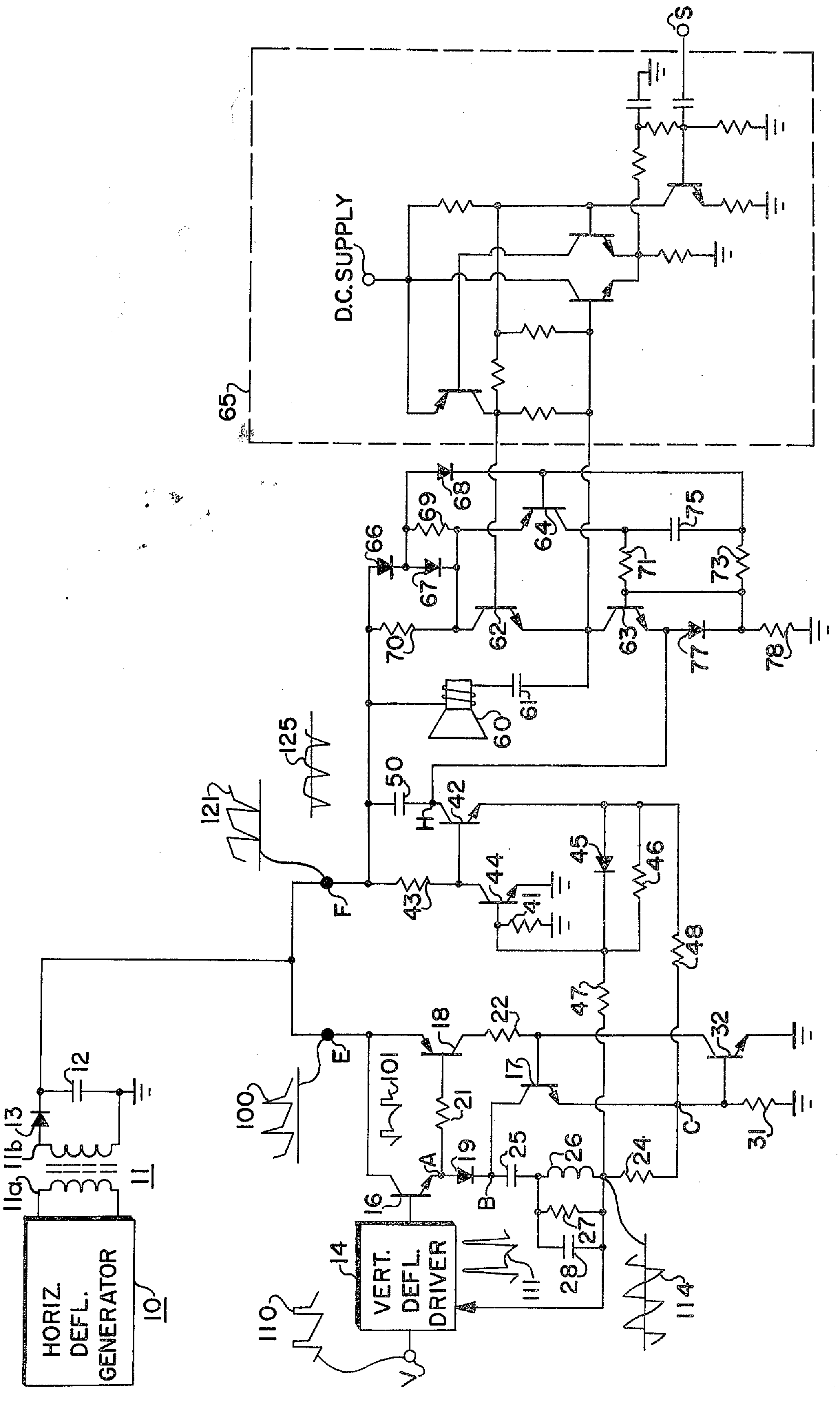
HORIZ. DEFL. GENERATOR
VERT. DEFL. DRIVER
D.C. SUPPLY

COMBINED AMPLIFIERS WHICH CONSUME SUBSTANTIALLY CONSTANT CURRENT

BACKGROUND OF THE INVENTION

This invention is related to an arrangement for combining amplifiers with variable current demands to produce a constant current demand on a power supply from which the amplifiers derive their operating current requirements.

In many television receivers, power supplies derive current voltage from the horizontal deflection system. This direct current voltage then provides operating potential for other receiver circuits. For example, the voltage developed may supply direct operating potential to such circuits as the receiver vertical deflection or audio stages.

It is frequently desirable to provide regulation for such supplies since they derive power from the horizontal deflection system. If regulation of some sort is not provided, undesirable variations such as fluctuation of the horizontal scan width may occur with changes in the current demands of the circuits utilizing the derived voltage. Regulation may be achieved by using a shunt regulator across the power supply or across the amplifier which consumes the derived power.

A problem associated with using a shunt regulator across the power supply or amplifier, however, is that it shunts unneeded current from the supply to ground. Consequently, a provision for a shunt regulator in the power supply or amplifier means that substantial amounts of power will be wasted when the amplifier requires only small amounts of power.

To substantially reduce the loss of energy which customarily accompanies the use of a shunt regulator, it would be desirable to combine a multiplicity of variable current consuming amplifiers in such a manner as to allow the sum of the currents consumed by the multiplicity of amplifiers to be maintained substantially constant.

SUMMARY OF THE INVENTION

In accordance with the invention combined amplifiers which consume substantially constant current include a source of direct current voltage and first and second amplifying means coupled to the direct current voltage source and comsuming first and second currents respectively in response to respective signals coupled to input terminals of the first and second amplifying means. Energy storage means are also coupled to the direct current voltage source. Controlled current conducting means are coupled to the first amplifying means and coupled to the energy storage means and the second amplifying means for being controlled by current flow in the first amplifying means for providing a path for storage of energy in the energy storage menans and a path for current through the second amplifying means, the current consumption in the first amplifying means being substantially the complement of the sum of the storage current and the current consumed be the second amplifying means such that the current drawn from the direct current voltage source is substantially constant.

DESCRIPTION OF THE INVENTION

In the FIGURE, voltage variations are induced across a first winding 11*a* of a horizontal output transformer 11 by operation of a conventional horizontal deflection generator 10 to which winding 11*a* is coupled. Similar voltage variations induced across a second winding 11*b* of transformer 11 are rectified by a rectifier 13 and stored in a capacitor 12 coupled between the cathode of rectifier 13 and ground.

The junction of rectifier 13 and capacitor 12 is coupled through a point E to the collector of a first vertical deflection output transistor 16 and to the emitter of a transistor 18. The base of transistor 18 is coupled through a current limiting resistor 21 to the emitter of transistor 16, point A. The collector of transistor 18 is coupled through a load resistor 22 to the base of a second vertical deflection output transistor 17 and to the collector of a signal coupling transistor 32.

The collector of transistor 17 is coupled to the cathode of a vertical retrace decoupling diode 19, point B. The anode of diode 19 is coupled to point A. The emitter of transistor 17 is coupled to point C, the base of transistor 32 and to ground through a sensing resistor 31. The emitter of transistor 32 is also coupled to ground.

A load circuit comprising a parallel combination of a deflection in winding 26, a retrace capacitor 28, and a retrace voltage limiting resistor 27 is alternating current coupled through an S-shaping capacitor 25 to point B. The remaining terminal of this parallel coupled load circuit is coupled through a feedback resistor 24 to point C.

The base electrode of transistor 16 is coupled to a vertical deflector driver circuit 14. The junction of feedback resistor 24 and the load circuit comprising elements 26, 27, and 28 is also coupled to deflection driver 14. Vertical deflection driver 14 may be of the type disclosed in copending U.S. Patent Application Ser. No. 383,207 filed July 27, 1973 or another suitable type.

The direct current voltage source at the junction of rectifier 13 and capacitot 12 is also coupled through a point F to a terminal of a load resistor 43, the remaining terminal of which is coupled to the collector of a transistor 44 and to the base of a transistor 42. The emitter of transistor 44 is coupled to ground. Its base is coupled through a resistor 41 to ground. The collector of transistor 42 is coupled through a storage capacitor 50 to point F. The emitter of transistor 42 is coupled to the anode of a diode 45, the cathode of which is coupled to the base of transistor 44. A resistor 46 is coupled in parallel with diode 45. The emitter of transistor 42 is also coupled through a current limiting resistor 48 to point C. The base of transistor 44 is coupled through a resistor 47 to the junction of the parallel coupled load circuit comprising elements 26, 27, and 28 and feedback resistor 24.

Point F is coupled to one terminal of the voice coil of a speaker 60, the remaining terminal of which is coupled through a direct current blocking capacitor 61 to the junction of the emitter of a first audio output transistor 62 and the collector of a second audio output transistor 63. The collector transistor 62 is returned through a resistor 70 to point F. The emitter of transistor 63 is coupled to the anode of a diode 77, the cathode of which is coupled through a resistor 78 to ground. The junction of diode 77 and resistor 78 is coupled to the base of transistor 63.

The anode of a diode 66 is also coupled to point F. The cathode of diode 66 is coupled to the anodes of two diodes, a diode 67 and a diode 68. The cathode of diode 67 is coupled to the collector of transistor 62 and to the emitter of a common base amplifier transistor 64. A resistor 69 is coupled in parallel with diode 67. The cathode of diode 68 is coupled to the base of transistor 64 and through a resistor 73 to the base of transistor 63. The collector of transistor 64 is coupled through a resistor 71 to the base of transistor 63. A capacitor 75 is provided between the collector and base of transistor 64.

The base of transistor 62 is coupled to an audio frequency driver amplifier 65. Feedback is also supplied to audio driver amplifier 65 from the emitter of transistor 62. Audio driver 65 is driven in response to an audio signal coupled to an input terminal S thereof. Audio driver 65 may be of the type illustrated or of another suitable type adaptable for use with the audio output amplifier illustrated in the FIGURE.

The operation of the constant current combination amplifier illustrated in the FIGURE will now be explained. Waveform 110 at terminal V causes vertical deflection driver 14 to drive emitter-follower transistor 16 such that voltage waveform 101 appears at point A. Transistor 18, the base of which is coupled to point A through current limiting resistor 21, remains in saturation during the entire trace portion of vertical deflection waveforms 110 and 101. During the positive peaks of waveforms 110 and 101 corresponding to the vertical retrace interval, transistor 18 is dirven into cutoff by the positive peaks of waveform 101 at point A.

During the vertical deflection trace interval, emitter-follower transistor 16 provides current through diode 19 to point B. S-shaping and alternating current coupling capacitor 25 first charges from this current source causing an approximately linearly decreasing deflection current in a first direction to flow in deflection winding 26.

As capacitor 25 charges, the consequent decreasing current flowing from deflection winding 26 through resistor 31 causes the collector voltage of transistor 32 to rise as its conduction decreases. This increased voltage supply coupled to the base of transistor 17 causes its conductivity to increase in opposition to the decreasing current flowing in winding 26. Thus transistor 17 and the parallel coupled load circuit including deflection winding 26 provide shunt paths for the emitter current of transistor 16, the conductivity of transistor 17 being controlled by the conductivity of transistor 32.

During the second half of the vertical deflection trance interval, the emitter current of transistor 16 continues to decrease as illustrated by waveform 100. Capacitor 25 has become fully charged and now discharges through transistor 17, feedback resistor 24 and the parallel coupled load circuit comprising elements 26, 27, and 28. This discharging of capacitor 25 causes the reversal of current in winding 26 necessary to produce the second half of the deflection trace interval.

At the end of the trace interval, the positive pulse of input drive waveform 110 at terminal V drives transistor 16 into saturation, causing the peak voltage pulse of waveform 101 to appear at point A. Transistor 18 is driven from saturation to cutoff by this waveform 101. The positive pulse is coupled to point B through diode 19. The pulse begins to reverse the current flow in winding 26 causing a high retrace voltage to appear at point B. Winding 26 is decoupled from point A by virtue of diode 19 which becomes reverse biased as the voltage at point B increases. The high voltage is stored in retrace capacitor 28 as winding 26 oscillates for a half cycle with capacitor 28 as illustrated by the high peak value of waveform 111, the voltage at point B. Resistor 27 limits the peak retrace pulse voltage attainable in this half cycle of oscillation. As this half cycle of retrace oscillation ends, the conduction of transistor 16 decreases from saturation to its trace interval state in response to waveform 110. The trace interval voltage illustrated in waveform 101 again appears at point A and transistor 18 again goes into saturation in response thereto.

The current through point E, which is the current consumed by the deflection amplifier, is illustrated by waveform 100. A complementary current, the current illustrated by waveform 121, flows through point F. This current also flows through resistor 48 and is summed at point C with the current passing through point E, illustrated by waveform 100. This summing action insures that the current flowing through resistor 31 is maintained substantially constant. As will be explained, the current through resistor 31 is the sum of the currents consumed by the deflection amplifier and the audio amplifier illustrated in the FIGURE.

As voltage initially appears at point F, storage capacitor 50 charges through diode 77 and resistor 78. Alternating current coupling capacitor 61 similarly charges through the voice coil of speaker 60 and through the quiescent current path established by conduction of the transistors 64 and 63.

In the operation of the push-pull audio amplifier, diodes 66 and 68 and resistors 73 and 78 provide a bias voltage for the base electrode of transistor 64. The quiescent and peak collector currents of transistor 64 are determined by the values of resistors 69 and 70. The collector current of transistor 64 drives transistor 63 which in turn provides a quiescent current path for transistor 62. Thus, the amount of quiescent current of output transistors 62 and 63 is controlled by the conduction of transistor 64 and flows from the direct current voltage supply at point F through the network comprising resistor 70 and the main current conduction paths of transistors 62 and 63.

In the presence of audio signal at terminal S, negative portions of an audio signal will cause transistor 62 to conduct more heavily, discharging capacitor 61 through the voice coil of speaker 60 as the emitter voltage of transistor 62 increases toward the voltage at point F. As the load current of transistor 62 increases from the quiescent current established in transistor 62, the voltage drop across resistors 69 and 70 becomes equal to the voltage drop across diodes 66 and 67. Under this condition, the emitter voltage of transistor 64 becomes substantially equal to the base voltage of transistor 64 and transistor 64 is thereby cut off, which in turn cuts off transistor 63.

As an audio signal coupled to terminal S goes positive, the load current through transistor 62 drops below the quiescent current level. Transistor 64 begins to conduct and, in turn, causes conduction of transistor 63. As an audio frequency signal coupled to terminal S goes positive, transistor 62 acts as voltage follower. The increasing voltage on the collector of transistor 62 representing the positive going audio signal is coupled from the collector of transistor 62 through transistor 64 to provide drive signal to the base electrode of transistor 63 which conducts to provide a charging path for coupling capacitor 61 from point F through the voice coil of speaker 60.

The total current through transistor 63 is the load current plus the quiescent current of transistor 62. During the time of maximum load current through transistor 63, the quiescent current of transistor 62 is reduced by the drive current coupled to the base of transistor 63 through the collector of transistor 64. However, the drive current through transistor 64 is relatively small compared to the quiescent current, and hence the quiescent current through transistor 64 remains substantially constant throughout the negative half cycle of an audio input signal coupled to terminal S.

Diode 68 provides temperature compensation for the emitter-base junction of transistor 64 thereby insuring a constant conduction of transistor 64 and a resultant constant quiescent current through transistor 62 independent of variation in the direct current supply voltage and DC operating point of transistor 62.

The emitter of audio output transistor 63 is not returned to ground potential but rather is returned to point H, the collector of transistor 42. Similarly the load circuit comprising speaker 60 and capacitor 61 is returned to voltage supply point F rather than ground from the junction of output transistors 62 and 63. This configuration for the audio amplifier and speaker circuit is chosen so that the combined current through the audio amplifier and speaker 60 from the direct current voltage supply can be controlled. This combined current is controlled by returning the audio amplifier current and speaker current to point H, the collector of transistor 42.

Transistors 44 and 42 function as a control network which monitors the current consumption of the vertical deflection amplifier and constrains the audio amplifier to consume a substantially complementary current such that the sum of the currents comsumed is constant. The purpose of storage capacitor 50 is to provide the quiescent current or audio signal current requirements of the audio amplifier during periods of peak current consumption of the vertical deflection amplifier at the beginning of the vertical deflection trace interval.

The current consumed by the vertical deflection amplifier is monitored by coupling the base of transistor 44 through resistor 47 to the junction of feedback resistor 24 and deflection winding 26. The positive portion of waveform 114 appearing at the junction of resistor 24 and winding 26 controls the conductivity of transistor 44. During the positive portion of waveform 114, when the deflection amplifier is consuming a substantial portion of the current supplied by capacitor 12, S-shaping capacitor 25 is charging through winding 26. Transistor 44 experiences its maximum conductivity, dropping the voltage from terminal F through resistor 43 to the base of transistor 42 below the level necessary to allow transistor 42 to conduct. Therefore, at the beginning of the vertical deflection cycle, transistor 42 remains in cutoff and the power requirements of the audio amplifier are supplied by discharging of storage capacitor 50 through the audio amplifier via the paths including resistor 70, diode 66, and transistors 62, 63, and 64 to point H. The charging current of capacitor 50 is illustrated by waveform 125. The discharging of capacitor 50 occurs during the negative portion of waveform 125. The audio amplifier may be designed such that its peak current requirements are supplied from the discharging of capacitor 50 through the audio amplifier during periods of peak current requirement by the vertical deflection amplifier. By using such a design, distortion in the audio output is avoided during periods when peak current is being supplied to the vertical deflection amplifier, i.e., at the beginning of the vertical deflection trace interval. Thus, discharging current in capacitor 50 occurs at the beginning of the vertical deflection trace interval.

As the current requirement of the vertical deflection amplifier decreases at a rapid rate during approximately the first third of the vertical deflection trace interval, the base voltage of transistor 44 decreases allowing its collector voltage to increase. The rapid decline from the positive peaks of waveform 100 illustrates the rate of change of current through point E during the first third of the trace interval. The decreasing base voltage of transistor 44 allows transistor 42 to become conductive providing an approximately linearly increasing current through point H at the same rate that the current through point E is decreasing. The steep increasing portion of waveform 121 illustrates this changing current. This current is supplied to the audio amplifier through resistor 70, diode 66, and transistors 62, 63, and 64 to point H as quiescent current of signal current. A portion of this current flows through the voice coils of speaker 60 and through capacitor 61 and transistor 63 to point H as signal current. A portion of this current illustrated by the positive portion of waveform 125 is supplied for charging of storage capacitor 50. Whichever path is taken the current is summed at point H and flows through the collector-emitter path of transistor 42 and resistor 48. This current flow is summed with the current consumed by the vertical deflection amplifier at point C and flows through resistor 31 to make the total current consumed substantially constant.

During approximately the latter two-thirds of the vertical deflection cycle the current consumption of the vertical deflection amplifier decreases substantially as illustrated by waveform 100. The rate of change of current consumed is again substantially linear but decreases only slightly during the latter two-thirds of the deflection trace interval. The current requirement of the vertical deflection amplifier decreases significantly as capacitor 25 sustains a maximum charge and begins to discharge, supplying the reversal of deflection current in winding 26. The slight change in the current consumed by the vertical deflection amplifier occurs because as capacitor 25 discharges, the conductivity of transistor 32 tends to decrease. This couples more drive current to the base of transistor 17 to achieve linearly increasing discharge current for capacitor 25 through transistor 17, feedback resistor 24 and deflection winding 26.

During the second half of the vertical deflection trace interval, the voltage at the junction of feedback resistor 24 and deflection winding 26 goes negative with respect to the voltage at terminal C as discharging current for S-shaping capacitor 25 flows through transistor 17, feedback resistor 24, and deflection winding 26. To maintain the base of transistor 44 at approximately its turn-on voltage, diode 45 is provided. Diode 45 clamps the base voltage of transistor 44 one diode drop below the emitter voltage of transistor 42. The diode drop will increase slightly as the voltage at the junction of feedback resistor 24 and winding 26 goes more negative with respect to the voltage at point C, causing diode 45 to become more conductive.

The emitter voltage of transistor 42 will remain positive with respect to the voltage at point C during the second portion of the vertical deflection trace interval by virtue of its conductive state during the second portion of the trace interval. It should be noted that the maximum current through resistor 48 and thus the maximum current through point F equals the forward diode drop of diode 45 divided by the resistance of resistor 48 assuming the base-emitter drops of transistors 32 and 44 are equal.

The current consumption of the combination of the storage capacitor and the audio amplifier is thus made substantially the complement of the current consumed by the vertical deflection amplifier as waveforms 100 and 121 indicate. Feedback resistor 24 is employed to sense the current requirement of the vertical deflection amplifier. The voltage across the feedback resistor 24 controls the conduction of transistor 42. The conduction of transistor 42 controls the current through the alternative paths to charge capacitor 50 and to provide quiscent and signal current for the audio amplifier. Thus it may be seen that using the current through vertical deflection feedback resistor 24 to control the conduction of transistor 42 gives the vertical deflection amplifier current requirement priority over the audio amplifier requirement during periods of peak current requirement by the vertical deflection amplifier.

Feedback is provided from the emitter of transistor 62 of the audio amplifier to audio frequency driver 65. This feedback minimizes vertical frequency distortion of the audio signal coupled to the voice coil of speaker 60 during such periods of peak current.

Resistor 31 and transistor 31 are employed to render the total current consumed by both amplifiers and the storage and discharge current of capacitor 50 substantially constant since an increase in the voltage across resistor 31 will result in increased conductivity of transistor 32. Transistor 32 becomes more conductive in response to increasing current flow through deflection winding 26 from point B to point C, increasing conductivity of transistor 17 and increasing conductivity of transistor 42. Transistor 32 serves to control these three currents such that their sum is constant. Transistor 32 couples control signals to the base of transistor 17 and aids in controlling the conductivity of transistor 42 by controlling the voltage at point C.

What is claimed is:

1. Combined amplifiers which consume substantially constant current, comprising:

a source of direct current voltage;

first and second amplifying means coupled to said direct current voltage source and consuming first and second currents respectively in response to respective signals coupled to input terminals of said first and second amplifying means;

means for sensing said current consumed by said first amplifying means;

energy storage means coupled to said source of direct current voltage; and controlled current conducting means coupled to said means for sensing current consumed by said first amplifying means and coupled to said energy storage means and said second amplifying means for being controlled by said current flow in said sensing means for providing a path for storage of energy in said energy storage means and a path for current through said second amplifying means, said current consumption in said first amplifying means being substantially the complement of the sum of said storage current and said current consumed by said second amplifying means such that the current drawn from said direct current voltage source is substantially constant.

2. Combined amplifiers according to claim 1 wherein said first amplifying means includes load circuit means for having current flow induced therein in response to said signals coupled to an input terminal of said first amplifying means and said sensing means are coupled to said load circuit means for sensing said load current.

3. Combined amplifiers according to claim 2 wherein controlled current conducting means includes an active current conducting device the main current conducting path of which is coupled in series with said energy storage means and in series with said second amplifying means for controlling the sum of said charging current of said energy storage means from said direct current voltage source and said current consumed by said second amplifying means from said direct current voltage source such that said sum is substantially the complement of said current consumed by said first amplifying means.

4. Combined amplifiers which consume substantially constant current, comprising:

a direct current voltage source;

first and second amplifying means coupled to said direct current voltage source;

sensing means coupled to said first amplifying means for sensing current consumed therein;

energy storage means coupled to said direct current voltage source;

controllable current conducting means coupled to said sensing means and responsive to variations in current flow therethrough for providing a path for operating current in said second amplifying means and a path for energy storage current in said energy storage means and for maintaining the sum of said operating and energy storage current substantially the complement of said current consumed in said first amplifying means for maintaining the sum of said current consumed in said first amplifying means and said combined energy storage current and operating current for said second amplifying means substantially constant.

5. Combined amplifiers which consume substantially constant current, comprising:

a source of direct current voltage;

a first current path coupled thereto, said first current path including first amplifying means for consuming a first current thereto in response to signals coupled thereto;

a second current path coupled to said direct current voltage source, said second current path including second amplifying means for consuming a second current in response to signals coupled thereto;

A third current path coupled to said source of direct current voltage, said third current path including energy storage means;

sensing means coupled to said first current path for sensing current consumed by said first amplifying means;

active current conducting means coupled to said sensing means and to said second and third current paths for controlling current flow in said second and third current paths in response to said current consumed by said first amplifying means for making the sum of the currents in said second and third current paths substantially the complement of the current in said first current path such that the sum of the currents flowing in said three current paths from said direct current voltage source is substantially constant.

6. Combined amplifiers according to claim 5 wherein said first amplifying means includes load circuit means for having current flow induced therein in response to signals coupled to an input terminal of said first amplifying means and said second means are coupled to said load circuit means for sensing said load current.

7. Combined amplifiers according to claim 6 wherein the main current conducting path of said active current conducting means is coupled in series with said second current path and in series with said third current path for controlling the sum of said charging current in said energy storage means from said direct current voltage source and said current consumed by said second amplifying means from said direct current voltage source such that said sum is substantially the complement of said current consumed by said first amplifying means.

8. Combined amplifiers which consume substantially constant current, comprising:

a source of direct current voltage;

first and second summing terminals;

first, second, and third current paths coupled to said source of direct current voltage, said first current path including first amplifying means for consuming a first current in response to signals coupled thereto, said second current path including second amplifying means for consuming a second current path in response to signals coupled thereto, and said third current path including energy storage means for storing energy in response to current flow therethrough, said second and third paths further being coupled at said first summing terminal and said first, second, and third paths being coupled at said second summing terminal;

controlled current conducting means coupled to said first amplifying means and to said first and second summing terminals and responsive to current flow in said first amplifying means for controlling the sum of currents in said second and third current paths through said first summing terminal such that the sum of currents flowing from said second summing terminal is substantially constant.

* * * * *

UNITED STATES PATENT OFFICE
CERTIFICATE OF CORRECTION

PATENT NO. : 3,904,973

DATED : September 9, 1975

INVENTOR(S) : Peter Eduard Haferl

It is certified that error appears in the above-identified patent and that said Letters Patent are hereby corrected as shown below:

Column 1, line 46, that portion reading "comsuming" should read -- consuming --. Column 1, lines 56 and 57, that portion reading "me-nans" should read -- means --. Column 3, line 28, that portion reading "dirven" should read -- driven --. Column 3, line 41, that portion reading "supply coupled to" should read -- coupled to --. Column 4, line 7, after "interval" and before "state" insert -- conductive --. Column 5, line 37, that portion reading "comsumed" should read -- consumed --. Column 7, line 35, that portion reading "transistor 31" should read -- transistor 32 --. Column 8, line 54, that portion reading " a first current thereto in response" should read -- a first current in response --.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*